United States Patent [19]

Marrero

[11] 4,098,423

[45] Jul. 4, 1978

[54] SELF-ALIGNING OUTLET BOX ASSEMBLY

[76] Inventor: Louis Marrero, 1209 Via Ramon, Escondido, Calif. 92025

[21] Appl. No.: 738,678

[22] Filed: Mar. 10, 1977

[51] Int. Cl.² ............................................. H02G 3/12
[52] U.S. Cl. .................................... 220/3.6; 220/3.7; 248/27.3; 248/DIG. 6
[58] Field of Search ............................. 220/3.2–3.94; 174/57, 58; 248/27.3, 205 R, DIG. 6; 339/34

[56] References Cited

U.S. PATENT DOCUMENTS

| | | | |
|---|---|---|---|
| 1,024,902 | 4/1912 | Kronberger | 220/3.7 |
| 2,047,640 | 7/1936 | Lauer | 220/3.7 |
| 2,297,862 | 10/1942 | Bachmann | 220/3.7 X |
| 3,361,089 | 1/1968 | Fischer et al. | 220/3.6 X |
| 3,378,160 | 4/1968 | Bassani | 220/3.6 |
| 3,794,956 | 2/1974 | Dubreuil | 220/3.7 X |
| 3,814,834 | 6/1974 | Glader | 220/3.7 X |

*Primary Examiner*—Stephen Marcus
*Attorney, Agent, or Firm*—Ralph S. Branscomb

[57] ABSTRACT

The invention is a multi-purpose electrical outlet box adapted for use with wall switches, plug outlet receptacles, and light fixtures, and includes a mounting bracket for attaching the assembly to a frame member of the building and a wiring box slidable within the mounting bracket, this wiring box being forwardly spring-biased in the mounting bracket but retained against the spring action, there being structure on a facia plate which releases the retaining detent to permit the wiring box to snap forward into final position, and the complete insertion of the facia plate causes the wiring box to be locked in its terminal position.

10 Claims, 9 Drawing Figures

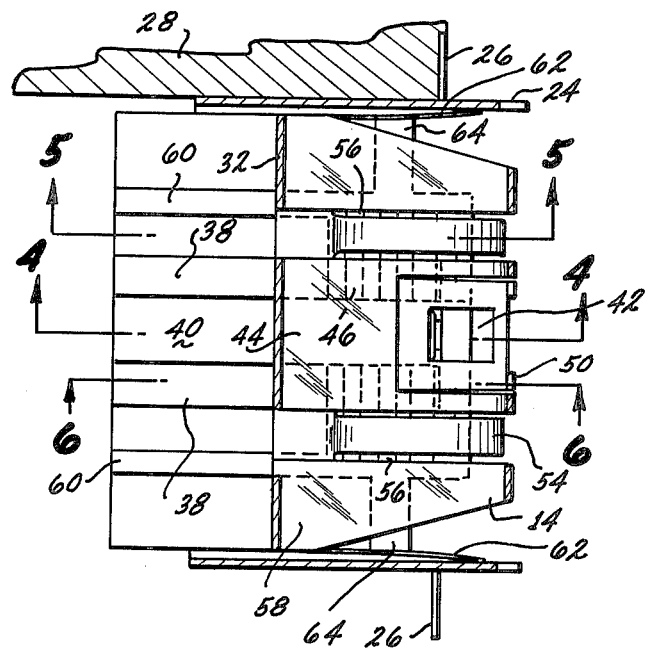

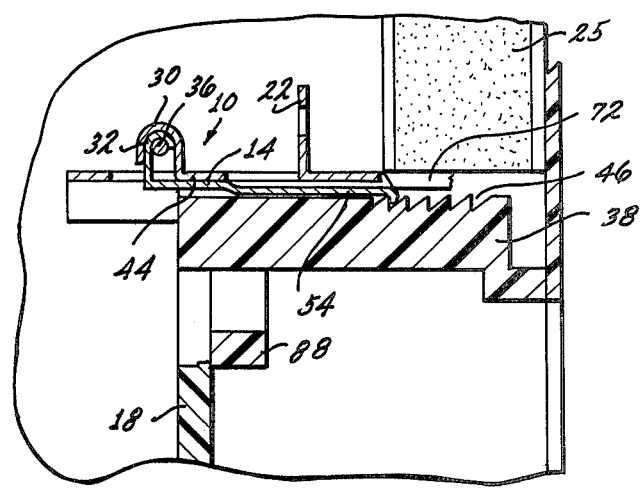
FIG.6
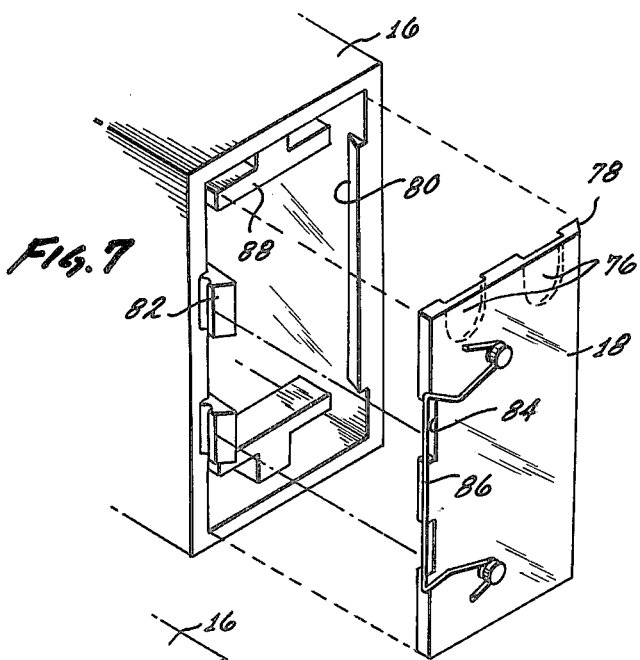
FIG.7
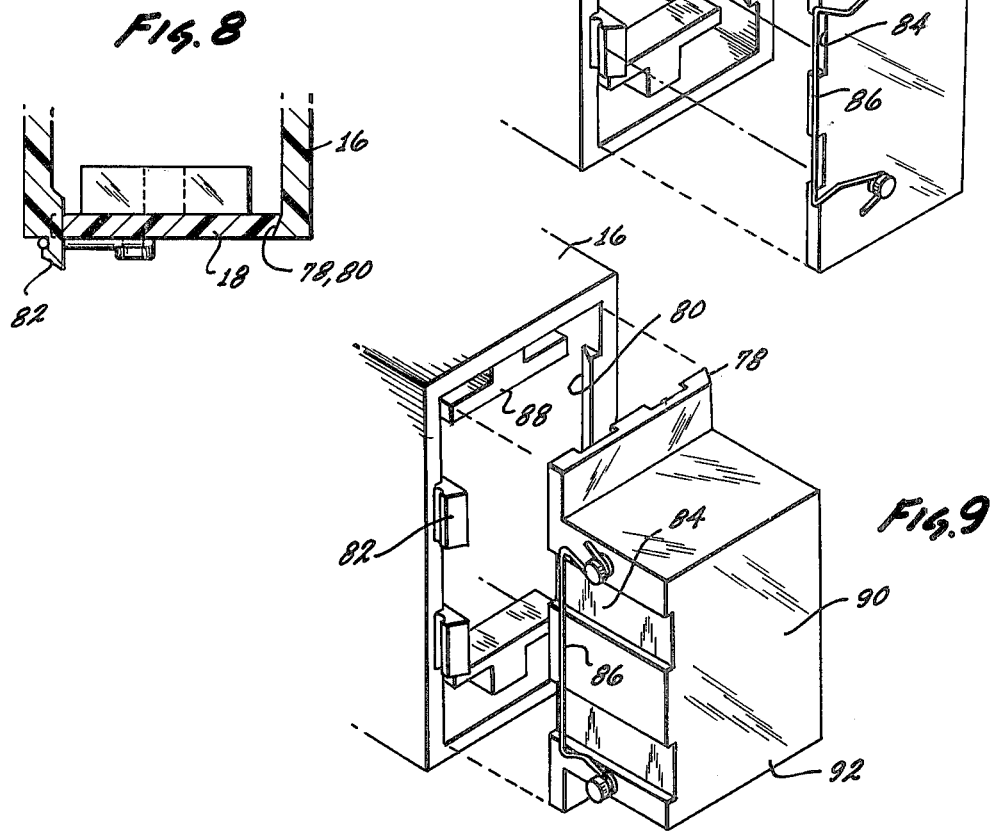
FIG.8
FIG.9

SELF-ALIGNING OUTLET BOX ASSEMBLY

BACKGROUND OF THE INVENTION

The invention relates to electrical boxes and particularly to a wiring box of the type used for plug receptacles and switches as it relates to installation proceedings, primarily in structures under construction.

Applicant is the owner of issued patents and patents pending which also relate to wiring boxes having as primary design parameters, speed, and simplicity of installation, and economy of manufacture. One of the features which enable the wiring box to be installed quickly and accurately is the ability to easily vary the position of the wiring box on its mounting after the wallboard has been installed so that it may be made flush with the wallboard subsequent to its installation. This feature obviates the otherwise time-consuming necessity of aligning the assembly on a wall stud such that after installation of the wallboard, the forward face of the wiring box falls in the plane of the inner surface of the wallboard. The adjustable wiring box also avoids the equally awkward procedure wherein the wallboard is placed over a protruding outlet box to permit marking the board for cutting the outlet box access opening.

Related devices for which Applicant has initiated patent proceedings are disclosed in applications having Ser. Nos. 685,045, and 709,629, and issued U.S. Pat. Nos. 3,928,716, and 3,953,689 and 4,035,052. These devices all utilize slidably mounted wiring boxes which are adjustable subsequent to mounting the wallboard, and one involves a spring-loaded wiring box which tends to snap forward in response to the act of installing the wallboard and cutting the access opening. This latter invention is disclosed in application Ser. No. 709,629.

SUMMARY OF THE INVENTION

The present invention is in the field of automatically aligning wiring boxes and in brief, constitutes a wiring box slidably received in a mounting bracket and spring-biased in the forward direction but retained rearwardly until a facia plate is installed. When the facia plate is installed, protruding triggers release detents restraining the wiring box, permitting it to snap forward, and upon further insertion of the facia plate into its final resting place, a pair of wedge elements securely lock the wiring box against sliding in the mounting bracket.

Although as stated, the wiring box is trigger-operable by means of a facia plate of the kind utilized for either a plug outlet or light switch, it may also be used in its retracted position as a mounting for a light such as a kitchen or breakfast room fixture. This latter mode provides the unit with versatility but does not utilize one of its more important features which is the automatic snap-forward capability.

The structure permitting the above-described function includes simplified stamped metal parts, one being a square mounting bracket base and another being a pair of stamped and formed elements secured in the base by means of nails also used for mounting the entire structure, these latter elements defining leaf springs to provide the forward bias and spring clips to selectively engage rack structure in a plastic wiring box to lock the wiring box against sliding. The facia plate has a number of rearward projections which are operatively dimensioned relative to these detent or spring clip elements connected to the bracket base such that upon mounting the facia plate, these spring detents are first released and then wedged into firm immoveable locking engagement in the racks.

BRIEF DESCRIPTION OF THE DRAWINGS

FIG. 3 is a sectional view taken along lines 3 — 3 of FIG. 2;

FIG. 4 is a sectional view taken along lines 4 — 4 of FIG. 3 but with the facia plate in position;

FIG. 5 is a vertical section taken along lines 5 — 5 of FIG. 3 but with the facia plate in position;

FIG. 6 is a vertical section taken along lines 6 — 6 of FIG. 3;

FIG. 7 is a perspective view of a fragment of the rear of the wiring box showing the back plate removed;

FIG. 8 is a vertical section of a portion of the apparatus of the type shown in FIG. 9 showing the clip attachment;

FIG. 9 is a perspective similar to FIG. 7 but showing an enlarged rear cover.

DETAILED DESCRIPTION OF THE PREFERRED EMBODIMENT

Figure 1:
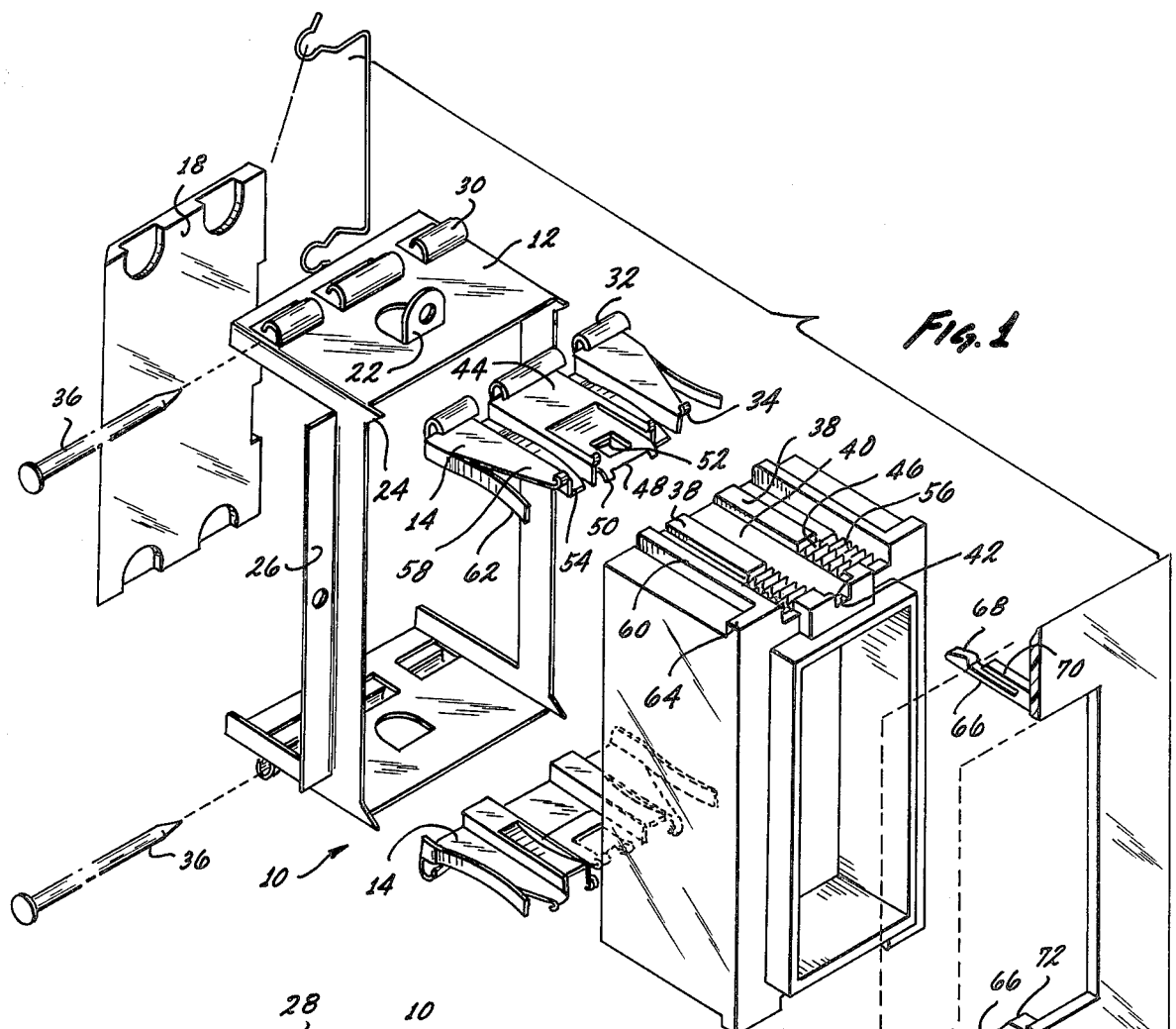
FIG. 1 is an exploded perspective view of the apparatus in its entirety.

The invention can be seen in toto in FIG. 1 wherein a mounting bracket generally indicated at 10 has a rectangular base 12 which is stamped and subsequently formed from sheet metal. The mounting bracket includes two other members 14 which are identical for the top and bottom of the base and are mounted to the base at the factory, although they are easily removable on site if desired. Other basic structure includes a wiring box 16 molded in plastic which slides within mounting bracket, a rear cover plate 18 which connects to the back of the wiring box and a facia plate 20 which is fastened around the actual operative portion of the wall switch or outlet receptacle on the inside of the wall board.

The mounting bracket includes the base 12 and clip members 14. The base is rectangular and is symmetrical about a plane through its center as is the rest of the structure, or in other words structure on the bottom of the assembly which may not be visible is simply a duplication of the structure illustrated on the top of the assembly.

A pair of upstruck tabs 22 at the top and bottom of the base are each provided with a threaded hole and are used to mount lighting fixtures of the bathroom and closet type wherein two long bolts are required to attach the fixture to the wiring box. These tabs are provided to accomodate that particular mode of use of the assembly although generally speaking the wall switch application and electrical plug outlet mode are the uses toward which the assembly has been designed.

At the corners of the forward edge of the base are four projections 24 which function to indent or score the back side of wall board 25 pressed against the mounting bracket to indicate where the access hole must be cut. On both sides of the rectangular frame of the base 12 are outwardly struck flanges 26 running nearly the entire height of the base and having at least one hole in each of these flanges through which nails may be driven into a building stud 28 as can be seen in FIG. 3.

These flanges are used to install the unit in a wall which has already been completed and function as follows. A hole is cut in the wall board just large enough to receive the wiring box which is pushed through at an angle and oriented such that the flanges 26 are disposed flush against the rear surface of the wall board adjacent the opening. The unit can be securely mounted by positioning a pair of reinforcement plates opposite the flanges on the forward surface of the wall board and passing a screw through each plate, through the wall board and into engagement with the hole in the respective flange so that the wall board surrounding the opening is tightly clamped by the compressive action of the flange and reinforcing plate as the screws are tightened. When not used for this application, the flanges provide a right angle to seat against a building stud.

A series of sleeves 30 stamped in the base receive inside sleeves 32 which are slightly smaller but otherwise identical and are formed in the clip members 14. The clip members have curved lips 34 which engage the front edge of the base member so that the base and clip members are connected by first engaging these lips, then aligning the respective sleeves 30 and 32, and then inserting nails 36 through the sleeves to secure the clip elements in place. These nails are also used to fasten the unit to a stud and of course may be reversed if the stud is on the other side.

The mounting bracket as thus described has a central opening into which the wiring box 16 is slideably received. The wiring box would ordinarily contain connecting structure for securing wires entrained from the rear of the box and could also have in the front the slotted electrical outlet structure designed to receive spade terminals of conventional electrical plugs, or wall switch structure such as the conventional wall toggle. The top and bottom of the wiring box are provided with rails and rack structure to cooperate with tracks and detent or spring clip structure of the clip members 14 as follows. As is most easily visualized from FIG. 1, a pair of spaced central rails 38 are provided at the top and bottom of the wiring box and have a flat relieved area 40 between them and a notch 42 in the forward edge structure to permit access to the flat area 40 from the front. The clip members include a central channel-forming track portion 44 which spans both of the rails 38 so that the rails ride in this channel as the wiring box slides back and forth.

The forward ends of the rails are notches as at 46 to act as racks, and a spring clip detent 48 is formed in each of the clip members 14, these detents having clip elements or tabs 50 to engage the racks 46. The detents are bent so that under ordinary circumstances the tabs in fact do engage the notched racks, and a central somewhat rearwardly tab 52 can be operated by inserting a screwdriver or the like from the front to raise the detent and free the notches from the racks, thus freeing the wiring box.

Alongside the central channel-forming member 44 the clip members provide two other spring clips 54 which in their ordinary position would be free of rack structure 56 provided in the wiring box to complement these clips. Since these racks are lower than the racks 46 as can be seen from FIG. 1, and the level of the clips or detents 54 and 48 are about the same, it is easy to visualize the fact that the central tabs engage their complementing racks while the outer tabs are clear.

Progressing outwardly along the clip members 14, alongside the spring clips 54 are additional track forming members 58 which cooperate with the rail members 60 so that altogether four rail and track combinations are provided in both the top and bottom of the wiring box and its bracket 10 so that the wiring box is securely established in its one dimensional sliding motion.

Figure 2:
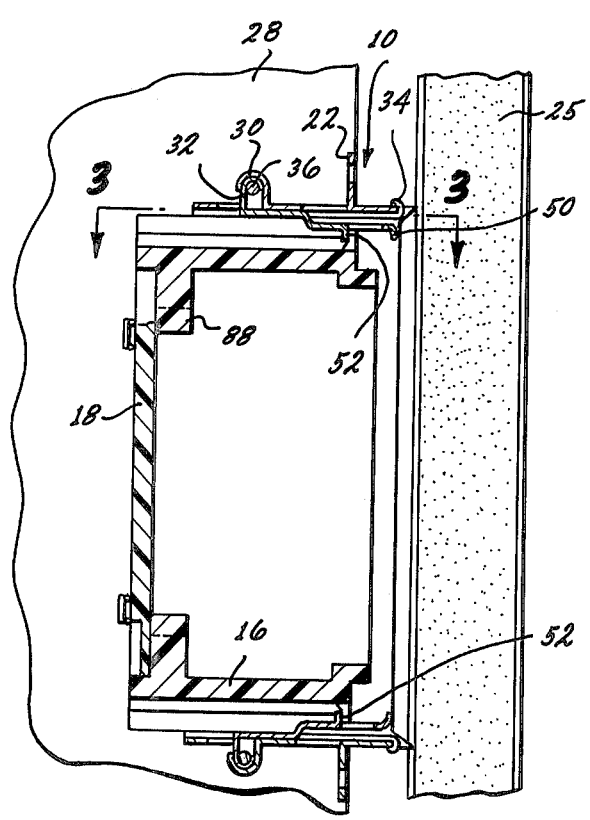
FIG. 2 is a vertical section taken centrally through the longitudinal axis of the apparatus.

The outermost structure of the clip elements 14 are the sidewalls which are shaped to define inwardly-curved leaf springs 62. Because of the several detent springs and these leaf springs, the clip members should obviously be made of good spring steel. The leaf springs 62 operate on shoulders 64 provided in the wiring box to urge the wiring box forward when it is received to a certain depth in the mounting bracket. Thus when the apparatus is assembled, the clip members 14 would be secured inside the base 12 semi-permanently and the wiring box would have been slid into the bracket until the spring tabs 50 engage over the front edge of the wiring box as is shown in FIG. 2. The wiring box is biased forwardly by the leaf springs 62 but will remain stationary until the detents are released. The outer spring clips 54 are not engaged in their respective racks. It should be noted at this time that the central racks 46 have forwardly directed teeth designed to prevent forward motion of the wiring box, whereas the racks 56 have teeth directed in the opposite sense.

The facia plate 20 which conventionally is provided for aesthetic purposes exclusively in the present invention has rearwardly extended trigger elements 66 with a rounded lobe 68 on the inner side of each trigger. These elements are so positioned, as can be seen in FIG. 1, that these triggers pass through the notch 42 and along the flat central area 40 so that they strike the tab 52 thus raising the detent 48 and freeing the wiring box as is best shown in FIG. 4. The wiring box then springs forwardly until it strikes the facia plate. At this point the tab 52 has passed beyond the lobe 68 on the trigger and the detent is released to settle into the racks 46 again.

Adjacent the triggers 46 are wedges 70 which are operative to force downward the detent 48 and insure a firm gripping of the racks. The facia plate has 4 other wedge elements 72 which operate on the spring clips or detents 54 in a similar fashion to the wedge 70, so that upon moving the facia plate flush against the inner surface of a sheet of wallboard, these wedge elements securely lodge the clips 54 into the racks 56.

In order to remove the assembly, the facia plate must be pulled out, which is easily done, and then the wiring box released by the insertion of a screwdriver through the notch 42 to raise the central detents.

The last remaining structure is the rear cover plate 74 illustrated in detail in FIG. 7. The rear cover plate is preferably molded in plastic and has several knockouts 76 which are pressed out with the fingers as needed to accomodate wires or cables. One side of the plate is beveled at 78 to slip into a mating sloped surface 80 inside the wiring box, and the other side of the wiring box has catch elements 82 which seat in notches 84 formed in the side of the plate and engage snap-wire 86 as the rear cover is swung into place in a hinge-like manner.

A pair of T-bars 88 which can be seen in FIGS. 7 and 9 are molded into the inner top and bottom surfaces of the wiring box. The purpose of these bars is to permit the engaging of Romex cables or the equivalent between the bars and the sides of the box so that, with these cables firmly secured, the back plate may be easily installed without having to simultaneously negotiate the springy cables.

FIGS. 8 and 9 illustrate a modified version of the rear cover numbered 90 which is identical in all functional aspects to the cover plate 74 except for the rearwardly extended cavity-defining casing 92. This cavity serves the sole purpose of technically enlarging the interior area of the wiring box so that if a number or wires lead into the box the amount of volume demanded by wiring codes for the extra wires is available. The method of attachment and other features of this plate are identical except that snap wire 86 is oriented 90° relative to the first embodiment shown.

The invention as thus described is quite simply and inexpensively manufactured and requires three simple injection plastic pieces and three stamped metal elements. All electrical wiring applications are provided for with the possible exception or large chandeliers which are seldom used at the present time, and wiring codes are easily met by selecting a particular one of perhaps several rear cover plates which provide the required volume for the number of cables or wires used. The outlet box provides the ultimate in simplicity of installation, requiring only a few hammer strokes to firmly mount the unit to a building stud, and the insertion of the facia plate to permanently and securely install the entire assembly.

I claim:

1. An electrical outlet box comprising:
   a. a mounting bracket element;
   b. a wiring box element received in said mounting bracket and slidably in a longitudinal direction therein;
   c. means biasing said wiring box element away from said bracket;
   d. restraining means operative to restrain said wiring box and said bracket element against said biasing means;
   e. a facia plate having at least one trigger means operative with said restraining means to release said restraining means upon said facia plate being installed, permitting said wiring box element to spring forward under the action of said biasing means into operative position in a wall when said facia plate is installed.

2. Structure according to claim 1 wherein one of said elements has a catch member and the other of said elements has a multi-positioned detent member engageable with said catch member, and one of said members is biased into engagement with the other of said members to define said restraining means, and said trigger means is operative to separate said members.

3. Structure according to claim 2 wherein said wiring box has a longitudinal rail on one side thereof and said bracket has a track to receive said rail in sliding relationship, a portion of said rail having a plurality of transverse notches therein to define said multiple-positioned detent member, and said catch member comprises a first spring clip attached to said bracket and selectively engageable in one of said notches.

4. Structure according to claim 3 wherein said spring clip has a tab extending toward said wiring box and said trigger slips between said wiring box and said tab to free said spring clip from said detent member when said facia plate is installed.

5. Structure according to claim 1 wherein said wiring box is provided with a multiply-notched longitudinally extended rack and said bracket has a second spring clip selectively engageable in one of the notches in said rack to hold said wiring box toward said facia plate, and said facia plate has a wedge element to wedge said second spring clip into engagement with said rack when said wiring box and facia plate approach each other to within a predetermined maximum spacing, whereby upon initially installing said facia plate said trigger frees said restraining means and said wiring box springs toward said facia plate, and upon further inserting said facia plate said wedge element locks said second spring clip against said bracket to seize said wiring box in position.

6. Structure according to claim 5 wherein said restraining means comprises a first spring clip selectively engaging notches of a multi-notched longitudinally extended rack on said wiring box, and said first and second spring clips are extensions of a unitary stamped member connected to said bracket.

7. Structure according to claim 6 wherein said stamped member includes at least one transverse sleeve axially aligned with a transverse sleeve integral with said bracket, and including an elongated fastener inserted through said sleeves to restrain said stamped member on said bracket and permit the engagement of said fastener in a building stud to mount said bracket.

8. Structure according to claim 6 wherein one of said elements is provided with a plurality of longitudinal rails and the other of said elements is provided with a plurality of longitudinal tracks slidably receiving said rails.

9. Structure according to claim 1 wherein said wiring box has an open rear end to receive a cover plate and including catch members to attach a cover plate, and further including a plurality of selectively attachable cover plates having a plurality of different rearwardly displaced volumes to augment the volume of said wiring box to accommodate different numbers of wires for different applications.

10. Structure according to claim 6 wherein said biasing means comprises a pair of leaf springs disposed on opposite sides of said bracket and being unitary with said stamped member.

* * * * *